United States Patent [19]

Straubel et al.

[11] 4,200,076
[45] Apr. 29, 1980

[54] FUEL CONTROL DEVICE FOR SUPERCHARGED DIESEL ENGINES

[75] Inventors: Max Straubel, Stuttgart; Klaus-Dieter Zimmermann, Vaihingen; Wolf Wessel, Oberriexingen; Wilfried Sautter, Ditzingen; Gerhard Stumpp, Stuttgart, all of Fed. Rep. of Germany

[73] Assignee: Robert Bosch GmbH, Stuttgart, Fed. Rep. of Germany

[21] Appl. No.: 36,108

[22] Filed: May 4, 1979

Related U.S. Application Data

[63] Continuation of Ser. No. 822,502, Aug. 8, 1977, abandoned.

[30] Foreign Application Priority Data

Aug. 20, 1976 [DE] Fed. Rep. of Germany ....... 2637520

[51] Int. Cl.² ............................ F02D 1/04; F02N 17/08
[52] U.S. Cl. ...................... 123/140 CC; 123/140 MC; 123/179 L
[58] Field of Search ................. 123/140 CC, 140 MP, 123/140 MC, 140 R, 179 L

[56] References Cited

U.S. PATENT DOCUMENTS

| | | | |
|---|---|---|---|
| 3,015,326 | 1/1962 | Wirsching et al. | 123/140 CC |
| 3,146,770 | 9/1964 | Garcea | 123/140 CC |
| 3,690,768 | 9/1972 | Nagasawa | 123/179 L |
| 3,727,598 | 4/1973 | Knapp | 123/140 MC |
| 3,766,899 | 10/1973 | Isselhorst | 123/140 CC |
| 3,915,139 | 10/1975 | Nishizawa et al. | 123/140 CC |
| 3,916,854 | 11/1975 | Barton et al. | 123/140 CC |
| 3,973,541 | 8/1976 | Nakamura et al. | 123/140 R |
| 4,064,856 | 12/1977 | Augustin | 123/140 CC |

FOREIGN PATENT DOCUMENTS

| | | | |
|---|---|---|---|
| 1202171 | 1/1960 | France | 123/140 CC |
| 4640056 | 11/1971 | Japan | 123/140 R |
| 0872902 | 7/1961 | United Kingdom | 123/140 CC |

*Primary Examiner*—Charles J. Myhre
*Assistant Examiner*—P. S. Lall
*Attorney, Agent, or Firm*—Edwin E. Greigg

[57] ABSTRACT

Associated with the fuel controller of a supercharged diesel engine is a mechanism which limits the maximum fuel quantity in all operational states as defined by engine speed and air flow rate. This mechanism includes a three dimensional cam, displaced in rotation by a first transducer responsive to rpm or air flow rate and further displaced axially by a second transducer responsive to the other of these variables. A cam follower attached to the main fuel control rod of the controller makes contact with and follows the surface of the cam, thereby limiting the maximum fuel quantity admitted to the engine. Special provisions permit an enlarged starting fuel quantity and also permit corrections on the basis of further parameters, such as temperature. Several embodiments are presented.

13 Claims, 4 Drawing Figures

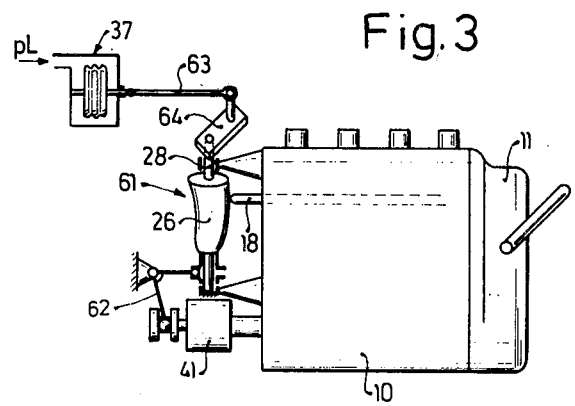
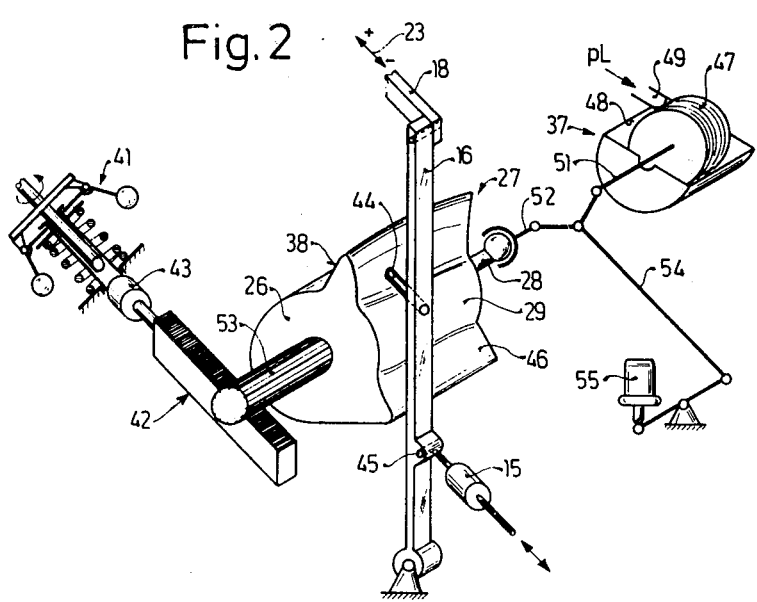

FUEL CONTROL DEVICE FOR SUPERCHARGED DIESEL ENGINES

This is a continuation of application Ser. No. 822,502, filed Aug. 8, 1977, now abandoned.

BACKGROUND OF THE INVENTION

The invention relates to a controller for supercharged diesel engines. Controllers of the type to which this invention relates are used to obtain an optimum adaptation of the instantaneous fuel quantity delivered by the injection pump so as to permit smokeless combustion; and the fuel supply may be further limited by operational variables of the engine. More particularly, the invention relates to a controller which employs a three-dimensional cam which is moved in one primary direction by an rpm-responsive member and in a second principal direction by a device which is responsive to the air flow admitted to the engine. The three dimensional cam has a suface which is contoured in a manner which coordinates surface points with the maximum permissible fuel quantity based on the prevailing rpm and air flow rate. Appropriate cam followers translate the point of contact into the corresponding position of the control rod of the fuel injection pump.

STATE OF THE PRIOR ART

Known in the art is, for example, a controller disclosed in the German Offenlegungsschrift No. 2 239 372, which includes a centrifugal rpm governor and a control cam which is rotated by the slide of the governor depending on changes in rpm. The control cam has a track which serves to limit the maximum fuel quantity associated with each rpm and also serves to provide an overall adaptation to the characteristics of the engine. The disposition of the cam track insures that the full-load fuel quantity is reduced in the lower rpm domain when the rpm is decreasing (negative adaptation). This insures that the engine does not receive too much fuel when the rpm is decreasing and thereby does not exceed the permissible smoke limit. The same negative adaptation is used in supercharged engines to provide an adaptation to the increasing air flow rate for increasing rpm. However, an adaptation of the fuel quantity in this manner, i.e., based only on rpm, is able to consider only a particular operational condition, for example only the full-load operation and the maximum fuel quantity associated with each rpm and the maximum air flow rate is the subject of control. By this method, the engine is caused to accelerate rapidly but, when the engine is accelerated from the partial-load domain in which the induction tube charging pressure has not yet reached the maximum value which it would have at the constant prevailing rpm, the engine receives a fuel quantity which is greater than permitted by the prevailing smoke limit or exhaust gas contamination, in addition to presenting the danger of engine overloads.

In a special embodiment of the above-described governor, as disclosed in particular in FIG. 5 of the above-mentioned Offenlegungsschrift, the maximum fuel quantity determined by the control cam is additionally corrected on the basis of the induction tube pressure by a control element and control linkage which moves a so-called induction tube pressure-dependent stop. The appropriate control path links are determined for a particular induction tube pressure and the appropriate full-load rpm is then determined, but only a single operational state can be considered. An induction tube pressure-dependent correction has the disadvantage that the increase of the fuel quantity during engine accelerations occurs with some delay because the measure of the required increase of fuel is in fact the induction tube pressure which increases only after an increase of pressure in the exhaust gas pressure and the exhaust gas temperature in engines which employ an exhaust gas-driven turbo charger. This mutual dependence of the fuel quantity, the charging pressure and the exhaust gas pressure together determines the overall acceleration characteristics of an engine equipped with an exhaust gas-driven turbo charger and the known controller in a disadvantageous manner and, furthermore, it is difficult or impossible to maintain operation within the permissible smoke limit because the permissible fuel quantity to maintain a predetermined smoking limit depends very importantly on the instantaneous rpm. But, the rpm-dependence is not the same for each value of the induction tube pressure. Rather, the curves of the permissible fuel quantity as a function of rpm and at a particular charging pressure have different slopes for each region of charging pressure (see FIG. 4). This dependency of the permissible fuel quantity on the rpm and the charging pressure or the air flow rate cannot be realized with the known controllers which are based either on rpm-dependence or charging pressure. Even a superposition of the charging pressure control signal on the rpm-dependent adaptation process, as taught by the above-described known centrifugal governor, results in large errors in the fuel quantity adaptation and thus forces a compromise in the design of the controller, resulting in a diminished torque and/or increased smoke values at least in a portion of the overall domain of engine operation, as well as causing diminished acceleration. A further disadvantage in the use of the known controllers for the operation of diesel engines is that the fuel flow limitation in the full-load domain actually depends not only on rpm and induction tube pressure but properly should be corrected for other influences, for example the thermal and mechanical loadability of the engine with the result that, if the charging pressure and rpm are used alone to determine the fuel rate limits, these limits will not be the correct ones.

OBJECT AND SUMMARY OF THE INVENTION

It is thus a principal object of the invention to provide a controller for diesel engines which permits using the engine up to its limit of performance and to obtain favorable acceleration. It is a further object of the invention to provide a controller for supercharged and fuel-injected diesel engines, especially those with an exhaust gas driven turbo charger, in which a first element limits the fuel quantity in dependence on the prevailing engine rpm and wherein the maximum fuel quantity associated with each rpm is set by a three dimensional cam. It is a further object of the invention to provide a second mechanism which changes the position of the three dimensional cam on the basis of a further operational parameter. Yet another object of the invention is to provide a controller in which the second parameter is the air flow rate provided to the engine.

These and other objects are attained according to the invention by providing a controller with a three dimensional cam which is displaced in a first principal direction on the basis of rpm and in a second principal direction by an air flow rate meter. It should be noted that three dimensional cams, which have been used for many decades in controllers for auto engines, i.e., spark plug-ignited, gasoline-burning engines, to adjust the fuel quantity in dependence on pedal position or other parameters, are not useable in their known construction for controlling diesel engines.

It is a particular advantage of the present invention that intermediate load points can also be correctly adjusted independently of the full-load fuel quantity so as to permit the maximum acceleration for the engine. A pair of numbers related to the rpm and air flow rate is associated with a particular point on the control surface of the cam and may also be based on the permissible smoke limit and other parameters which affect the performance of the engine.

A rapid acceleration after engine starting is obtained by connecting the three dimensional cam with the first control element by means of a drag link and by providing a suitably stepped surface on the cam for metering out an excess fuel quantity during the starting phase of the engine. This excess quantity is maintained by locking the cam until the highest rpm has been reached whereas, after the first downward control, the previously fixed fuel quantities are limited or controlled. If the three dimensional cam is further provided with an rpm controlling region it is possible to dispense with a separate rpm governor, thereby considerably simplifying the overall installation.

The air flow rate may be measured by proven and known means in that a pressure-sensitive element is placed in the induction tube of the engine. It is of particular advantage if the pressure sensing transducer is responsive to the absolute induction tube pressure because even supercharged diesel engines may sometimes have induction tube pressures below 1 bar and the monitoring of sub-atmospheric pressures in these domains prevents the injection of an excessive amount of fuel. In order to protect the engine from overloading, the connection between the air flow meter and the three dimensional cam or between the cam and the fuel adjustment member is made by interposition of a third element which adjusts the permissible fuel quantity on the basis of further parameters, for example the air or exhaust gas temperature.

A preferred to space saving disposition of the controller according to the invention is obtained by moving the three dimensional cam in one principal direction of operation on the basis of rpm information, especially when used in a governor which includes a member that sets the fuel quantity and which also includes an rpm-dependently displaceable governor sleeve.

The invention will be better understood as well as further objects and advantages thereof become more apparent from the ensuing detailed description of three preferred embodiments of the invention taken in conjunction with the drawing.

BRIEF DESCRIPTION OF THE DRAWING

FIG. 2 is a similar illustration of a second exemplary embodiment of the invention;

FIG. 3 is a simplified illustration of a third embodiment of the invention; and

DESCRIPTION OF THE PREFERRED EMBODIMENTS

Figure 1:
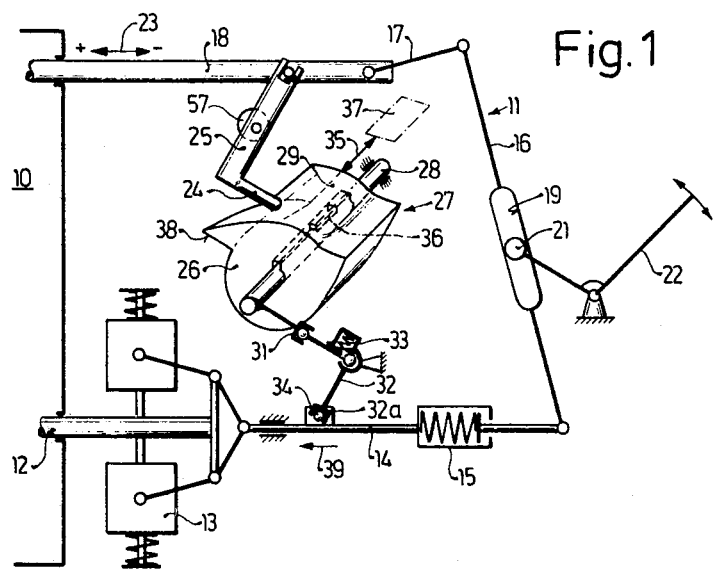
FIG. 1 is a schematic partially perspective view of a first exemplary embodiment of the invention.

Turning now to FIG. 1, there will be seen an illustration of a first preferred exemplary embodiment of the invention including a schematically indicated fuel injection pump 10 from which extends a shaft 12 carrying a centrifugal governor 13 and a sliding control element 14 displaced thereby. The control element 14 is provided with an elastic drag link 15 and is coupled via an intermediate lever 16 and a connecting tab 17 with a fuel control rod 18 which adjusts the fuel delivered by the injection pump 10. It is also possible to embody the tab 17 as an elastic drag link so as to permit relative motions of the control rod 18 and the intermediate lever 16 and so to prevent excessive mechanical stresses in the linkage. In known manner, the intermediate lever 16 has an elongated opening or slot 19 which is engaged by a pin 21 of an adjustment lever 22 which serves for the arbitrary and deliberate setting of the control rod 18. By rotating the lever 22 in the counterclockwise sense, the control rod 18 is displaced in the direction of providing a larger amount of fuel, as indicated by the arrow 23. This motion of the control rod 18 is limited by a finger 24 attached to a pivotable follower 25 which makes contact with the surface of a three dimensional cam 26 which is part of a fuel control mechanism 27. The basic overall shape of the cam 26 is seen to be substantially cylindrical and it is mounted on a shaft 28 which is itself affixed to the housing. The three dimensional cam is capable of axial displacement on the shaft 28 but is keyed to the shaft 28 to prevent relative rotation therewith. The three dimensional cam 26 is provided with a control surface 29, the exact shape of which is used to define the functional relationship between the fuel admitted to the engine and various operational states as will be further discussed in detail. The surface of the cam is followed by the finger 24 belonging to the follower 25 so that each point of the surface 29 is associated with a particular rpm and a particular air flow rate and serves to limit the fuel quantity admitted under those conditions. The three dimensional cam 26 may be rotated by rotating the shaft 28 on which it is keyed. For this purpose, the shaft 28 is coupled via a lever 31 and a pivotable drag lever 32 made in two pieces and held together by a spring 33 in the initial position as shown. The forked end 32a of the lever 32 engages a pin 34 on the control element 14. The axial motions of the control element 14 are thus transformed by the lever 32 into a rotary motion of the shaft 28 and hence of the three dimensional cam 26. It will be appreciated that the transformation of the rpm-dependent displacement of the control element 14 into a rotation of the shaft 28 may also be performed by any other known suitable mechanism, for example rack-and-pinion, gear quadrants, etc.

The axial motion of the cam 26 on the shaft 28, as suggested by the arrow 35, is made possible by a keyed spline connection, shown in dashed lines, which insures that the cam does not rotate with respect to the shaft. The cam 26 is displaced axially in response to the air flow rate through the engine. For this purpose, it is shown to be coupled schematically with an air flow rate meter 37 which will be described in greater detail below with the aid of FIG. 2. The control element 14 which displaces the cam 26 in rpm-dependent manner will hence-forth be referred to as a first control element whereas the air flow rate meter 37 will be referred to as a second control element. The cam surface has a stepped-off portion 38 which engages the finger 24 when the engine is stopped so that the control rod 18 is able to reach a position in which an excess starting quantity is admitted to the engine. After the engine has started, and it has run up to higher rpm, the control element 14 moves in a direction of the arrow 39 in response to the diverging centrifugal weights and the surface 38 is engaged by and arrested by the finger 24 of the lever 25. Thus, when the control element 14 continues to move in the direction of the arrow 39, the cam remains stationary so that the portion of the pivotal lever 32 which engages the pin 34 continues to turn and thereby tenses the spring 33 until such time as the drag link 15 is fully compressed, thereby urging the lever 16 to pivot in the clockwise sense and to withdraw the control rod 18 to the right as seen in FIG. 1, i.e., in the direction of "stop". This latter motion of the control rod 18 tends to disengage the finger 24 from behind the step 38 so that the tensed drag spring 33 pulls the lever 32 back into its original position as illustrated in FIG. 1 and the cam 26 is rotated back into its position for example as shown in the figure, i.e., a position in which the finger 24 rides on the control surface 29.

As has already been mentioned, the three dimensional control surface 29 is so configured that rotary motion of the cam changes the control points in response to engine rpm whereas the axial displacement of the cam alters the effective control point in dependence on the air flow rate as transduced by the air flow rate meter 37. The height, i.e., the radial distance of the control surface from the shaft 28 then defines the maximum fuel quantity associated with the pairs of values of the primary variables. This maximum fuel quantity is determined for each engine by experiments in which the important criteria may be the smoke limit and/or other parameters which affect the performance of the engine. The exact manner of associating a fuel quantity with engine variables will be further described below with the aid of FIG. 4.

In a second exemplary embodiment of the invention illustrated in FIG. 2, those elements which retain similar functions have been provided with the same reference numerals as were used in FIG. 1. In this embodiment, the three dimensional cam 26 is rotated by a control element 41 which displaces a rack 42 engaging a pinion 53. The control governor 41 is shown to be a centrifugal governor but it may also be another rpm-dependent transducer, for example a hydraulic piston. The cam 26 of this embodiment also has a stepped-off portion 38 for providing an excess starting quantity and an elastic drag link 43 permits a locking of the cam follower behind the stepped-off portion 38 for the purpose of providing the excess fuel quantity in a manner similar to that explained with respect to the operation of the first exemplary embodiment of FIG. 1. In this embodiment, the intermediate lever 16, which is coupled to the fuel control rod 18, carries the cam follower finger 44 which operates in a similar manner as the finger 24 previously described with respect to the first exemplary embodiment. The pivotal point 45 of the lever 16 is engaged by a governor such as the flyweight governor 13 of FIG. 1 (not shown in this embodiment) or the lever 16 may be engaged directly by the accelerator pedal of the vehicle acting via a drag link 15. In that case, the three dimensional cam 26 also assumes the functions of the controller and is provided with a control surface 46 which permits downward control and thus a limiting of the maximum rpm. For the correct engine speed and thus the position of the rpm control element 41, the rack and pinion drive 42,53, the follower 44 and hence also the intermediate lever 16 and the control rod 18 are moved in the direction of engine stop. An extension of the shaft 28 is engaged by an induction tube pressure transducer 37 which indirectly measures the air flow rate due to the intimate connection between the induction tube pressure and air flow rate. The induction charging pressure transducer 37 includes an evacuated pressure cell 47 and thus is responsive to the absolute pressure, thereby permitting the detection of pressures below 1 bar and their transformation into an appropriate displacement of the attached linkage. A pressure chamber 48 containing the pressure cell 47 communicates through a line 49 with the induction tube of the engine and one end of the pressure cell 47 is connected to a rod 51 acting via a second rod 52 to transmit the expansionary motions of the pressure cell 47 into axial displacements of the shafts 28 of the cam 26. In this case, the cam 26 is fixedly attached to the shaft 28 and both the shaft and the cam are moved together in rotation and in axial motion. The splines on the pinion 53 are long enough to permit sufficient axial motion of the cam and the shaft. The rods 51 and 52 are coupled via a wishbone lever 54 which is actuated by a third transducer 55 and which changes the relative distance between the levers 51 and 52, i.e., between the pressure cell 37 and the cam 26. The third transducer 55 is a temperature sensor which responds to the intake air temperature and corrects the relative position of the transducer 37 and the cam 26 so that the cam follower 44 moves into a corrected position on the surface 29, thereby delivering a corrected fuel quantity Q. If necessary, the third transducer 55 may be subject to exhaust gas temperature or other engine parameters. Still further correcting transducers may be attached in this vicinity. Alternatively, the third control transducer or some other control element may be placed in the connection between the cam 26 and the control rod 18, thereby correcting the delivered fuel quantity as indicated schematically by an eccentric bearing 57 in the first exemplary embodiment of FIG. 1.

In the third exemplary embodiment of the invention, illustrated in simplified manner in FIG. 3, the overall control mechanism 61 is shown to be attached to the fuel injection pump in a separate location from the rpm governor 11 and thus serves as a full-load stop which operates in a manner independent of the governor 11 to limit the position of the control rod 18. In this case, the three dimensional cam 26 is displaced axially by a lever 62 pivoting in response to the rpm of the engine as sensed by an rpm transducer 41, whereas an air flow meter 37 acts via a rod 63 and a lever 64 to rotate the cam 26.

In general, it is not a matter of substantial significance whether the cam 26 is moved by the first control element in the axial or rotary sense. Furthermore, it is not strictly necessary for the cam 26 to have a basically cylindrical shape and it may also be a plate having peripheral lobes or surface lobes.

Figure 4:
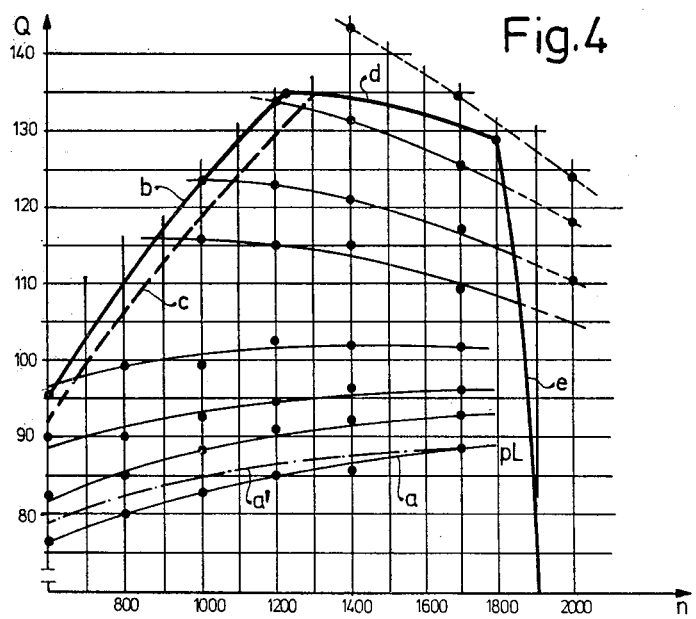
FIG. 4 is a diagram showing the permissible fuel quantity as a function of rpm for various induction tube charging pressures.

FIG. 4 is a diagram in which the fuel quantity Q is plotted in dependence on engine rpm and a family of curves is drawn for various values of the parameter pL which is indicative of induction tube charging pressure. A constant charging pressure results in curves such as "a" which are seen to have different slopes, indicating that the permissible maximum fuel quantity Q max changes drastically with rpm. These curves were drawn for a constant maximum permissible smoke limit, i.e., exhaust gas coloring, and the thick curve "e" determines the full-load fuel quantity Q which pertains if the smoke limit of the engine is the parameter which defines the maximum permissible power. If other engine parameters, such as thermal or mechanical loads of the engine require a reduction of these maximum fuel quantities, the curves would be those corresponding for example to the curve "c". The heavy curve portion "d" indicates the maximum torque whereas the heavy curve portion "e" is a shut-off control curve such as controlled by the surface portion 46 in the cam 26 of FIG. 2. Each point in the diagram associated with a particular rpm and a particular charging pressure pL thus defines a maximum permissible fuel quantity Q max which is used to calculate the corresponding elevation of the associated point in the control surface 29 of the cam 26. The points of the diagram which, at constant rpm, lie below the curve portion "d" are traversed only during acceleration so that curves such as "a" further removed from the curve portion "d" can be slightly raised even though that exceeds the smoke limit, at least in the lower rpm domain. This results in a substantially improved acceleration of the engine. A corrected curve "a" is illustrated in the Figure in dashed-dotted manner and is designated "a'".

The foregoing relates to preferred exemplary embodiments of the invention, it being understood that other variants and embodiments are possible within the spirit and scope of the invention.

What is claimed and desired to be secured by Letters Patent of the United States is:

1. A fuel controller for fuel-injected, turbo-charged diesel engines including an injection pump for admitting fuel to the engine and containing fuel control means for adjusting the amount of fuel so admitted, with an rpm governor which determines a setting of the fuel control means of the injection pump, which governor has a service lever and a regulator member which is displaceable in dependence on the rpm and coupled to the control means and the controller is provided with a control apparatus serving as a full-load stop, said rpm governor being coupled to said fuel-control means through said service lever and said regulator member for determining the setting of said fuel control means independently of said control apparatus and wherein the control apparatus comprises:
   a control cam disposed for rotation about a shaft attached to said controller, and disposed for linear displacement along the axis of said shaft;
   a first control element, responsive to engine speed (rpm) for adjusting one of said rotation or said linear displacement of said control cam;
   a second control element, generating an actuating force, directly responsive to the air flow rate into said engine, for adjusting the other of said rotation or said linear displacement of said control cam;
   said control cam is provided with a contoured surface and there is disposed on said fuel controller cam follower means for following said contoured surface of said control cam, said cam follower means being coupled to said fuel control means for limiting the maximum amount of fuel admitted to the engine under full-load conditions for any given set of values of said engine speed (rpm) and said air flow rate.

2. A fuel controller as defined by claim 1, wherein each point on said control surface is defined by fixing the maximum amount of fuel admitted to said engine, said maximum quantity being determined by the maximum permissible smoke limit.

3. A fuel controller as defined by claim 1, wherein each point on said control surface is defined by fixing the maximum amount of fuel admitted to said engine, said maximum quantity being determined in each case by a performance-limiting variable of said engine.

4. A fuel controller as defined in claim 1, further comprising a drag link connected between said first control element and said control cam to provide a linkage of variable length and wherein said contoured surface on said control cam includes a portion which is related to providing an excess fuel quantity during engine starting.

5. A fuel controller as defined by claim 1, wherein those points on said control surface associated with rpm and air quantity which correspond to fuel quantities below the maximum supplied fuel quantity are determined by the smoke limit in the lower rpm domain and by the smoke limit and/or other variables in the other load and rpm domains of the engine.

6. A fuel controller as defined by claim 4, wherein said contoured surface of said control cam further includes a region providing engine speed control to limit the maximum permissible rpm.

7. A fuel controller as defined by claim 1, wherein said second control element is a transducer in the induction tube of said engine responsive to induction tube pressure.

8. A fuel controller as defined by claim 7, wherein said pressure transducer is responsive to the absolute air pressure.

9. A fuel controller as defined by claim 1, further comprising a third control element responsive to an engine variable and connected between said second control element and said control cam.

10. A fuel controller as defined by claim 1, further comprising a third control element responsive to an operational engine variable and means for connecting said third control element between said fuel control means and said control cam.

11. A fuel controller as defined by claim 1, further comprising second and independent rpm-responsive means for adjustng the position of said fuel control means.

12. A fuel controller as defined by claim 11, wherein said second and independent rpm-responsive means is located on said controller in a separate and independent location from said control cam and said first and second control elements.

13. A fuel controller as defined by claim 11, wherein said control cam is displaced in rotation or linear displacement by said second and independent rpm-responsive means.

* * * * *